Feb. 22, 1966    L. WALLERSTEIN, JR    3,236,334
VIBRATION SUPPRESSOR
Filed Jan. 6, 1964    2 Sheets-Sheet 1

INVENTOR.
Leon Wallerstein Jr
BY Ralph Hammar
Attorney

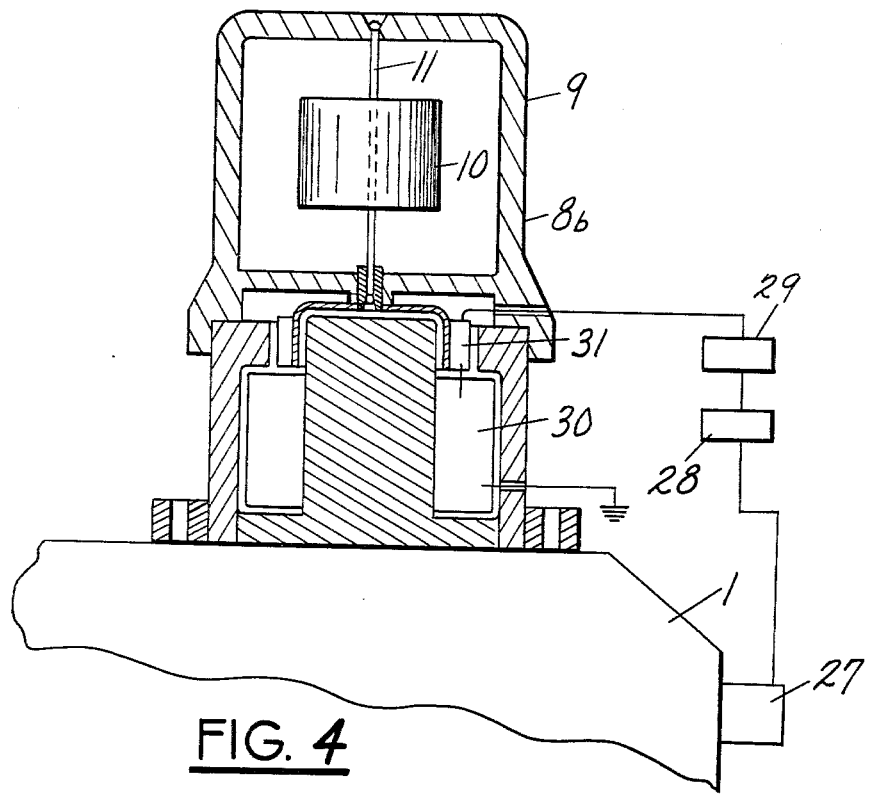
FIG. 4
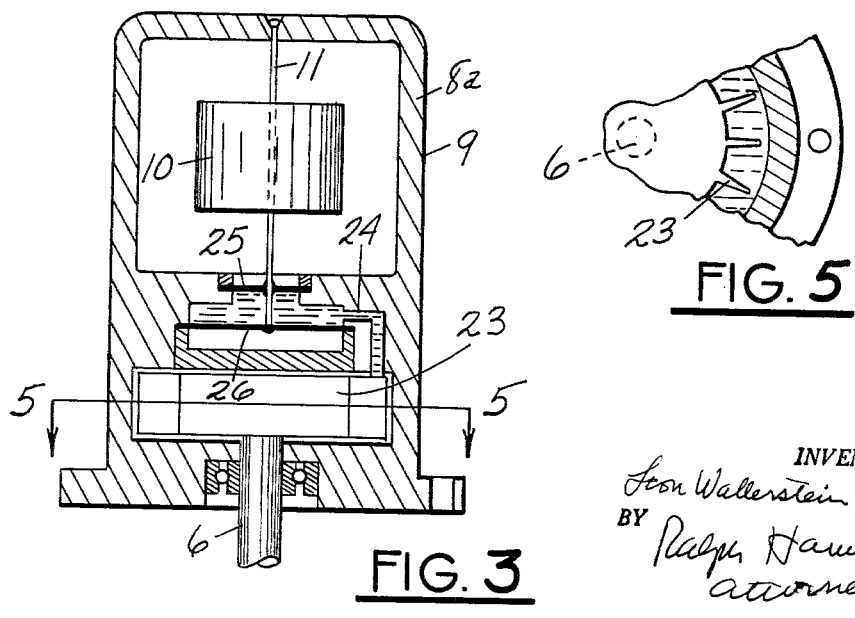
FIG. 3
FIG. 5

United States Patent Office 3,236,334
Patented Feb. 22, 1966

3,236,334
VIBRATION SUPPRESSOR
Leon Wallerstein, Jr., Erie, Pa., assignor to Lord Manufacturing Company, Erie, Pa., a corporation of Pennsylvania
Filed Jan. 6, 1964, Ser. No. 335,972
9 Claims. (Cl. 188—1)

This invention is intended to suppress shaft vibrations in directions radial to the axis of rotation by a non rotating weight suported to vibrate in radial directions and whose natural frequency is tuned to correspond with variable shaft speed frequency, or a multiple thereof.

Figure 1:
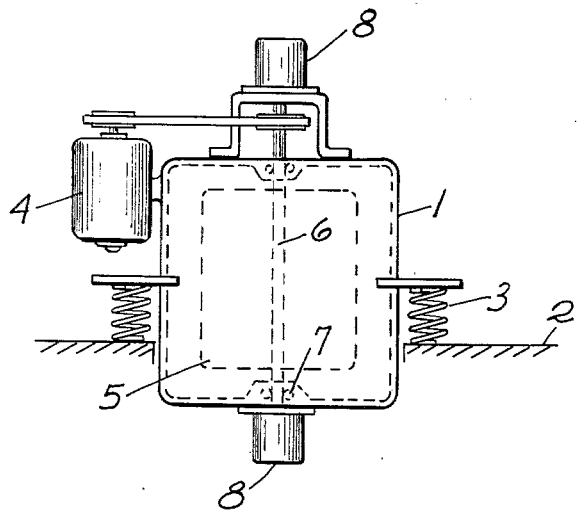
Figure 2:
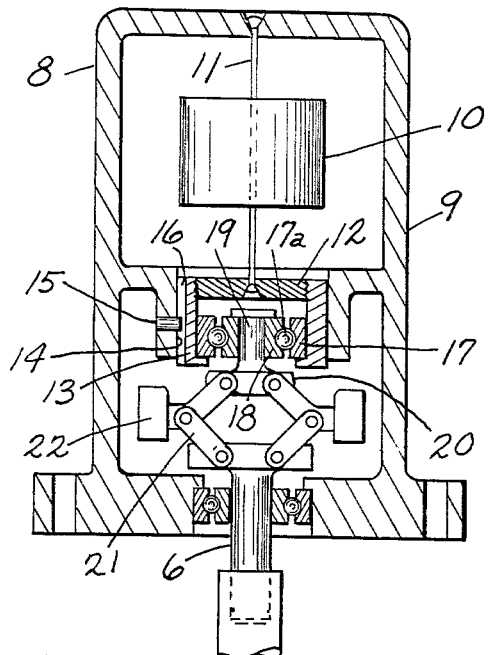

In the drawing, FIG. 1 is a diagrammatic elevation of a centrifuge in which radial vibrations are counteracted by the counter vibrating force from vibration suppressors, FIG. 2 is a sectional elevation through one of the suppressors, FIGS. 3 and 4 are sections through modifications of the suppressors, and FIG. 5 is a fragmentary section of FIG. 3.

In the drawing, 1 is the outer case or housing of a centrifuge suitably supported on a base 2 by springs 3. A motor 4 drives the rotor 5 having its shaft 6 journaled in bearings 7. These parts are or may be of common construction.

At opposite ends of the casing 1 the shaft 6 is extended to drive suppressors 8, shown in section in FIG. 2. Each of the suppressors has a housing 9 fixed to the centrifuge housing 1. Within the housing is a weight 10 mounted on a wire 11 coaxial with the shaft 6 and having one end anchored to the housing 9 and the other end anchored to a disc 12 fixed to a bearing housing 13 slidable in a bore 14 in the housing 9. Rotation of the bearing housing is prevented by a key 15 riding in a slot 16 in the bearing housing. The weight vibrates in a plane perpendicular to the axis of the wire. The outer raceway 17 of a ball bearing 17a is fixed to the bearing housing. The inner raceway 18 of the bearing 17a is fixed to a stub shaft 19 having a collar 20 connected to the shaft 6 by pivoted links 21 carrying centrifugal weights 22.

As the shaft 6 rotates, the centrifugal force of the weights 22 applies an end thrust to the bearing housing 13 through the bearing 17a tensioning the wire 11 with a force proportional to the square of the speed of rotation. The weight does not rotate but can be excited to vibration in a plane transverse to the wire 11 and will have a natural frequency proportional to the square root of the tension in the wire. Hence, the natural frequency of the weight 10 is directly proportional to the driving speed and may be made equal to the driving speed or to any multiple or submultiple of the driving speed even though said speed may vary. Forces due to unbalance of the centrifuge rotor act in a radial direction and excite the weight 10 to vibrate in a radial direction and to apply a counter vibratory force to the centrifuge housing according to the principle of the well known Frahm vibration absorber, and thereby prevents, or at least greatly reduces, vibration of the centrifuge rotor due to unbalance.

In FIG. 3 and corresponding parts of the suppressor, 8a and 8b are indicated by the same reference numerals.

In FIG. 3, the tension in wire 11 is applied hydraulically. An impeller 23 on shaft 6 develops a fluid pressure proportional to the square of the shaft speed which is applied through way 24 to the space between diaphragms 25, 26 fixed at the center to the wire 11 and at the periphery to the housing 9. Since the diaphragm 26 is larger than the diaphragm 25, there is a resultant force tensioning the wire 11 proportional to the square of the shaft speed.

In FIG. 4, a vibration pickup 27 is mounted on the centrifuge and has an output proportional to the vibration of the centrifuge housing 1 which is fed through a frequency to D.C. converter 28 and D.C. amplifier 29 so the output current is proportional to the frequency of the vibration. The current flows through field coil 30 and force coil 31 producing a tension in wire 11 proportional to the square of the vibration frequency.

In all forms of the suppressor, the wire 11 has negligible bending stiffness and the mass 10 is substantial so the frequency of vibration of the absorber mass is substantially proportional to the tension in the wire.

What is claimed as new is:
1. In combination, a device having a frame with a first rotating shaft journaled therein, a vibration suppressor mounted on said frame, comprising a suppressor frame, a wire anchored at one end to the suppressor frame, a bearing housing slidably and non rotatably mounted in the suppressor frame and anchored to the other end of the wire, a weight mounted on the wire between its ends, another shaft journaled in and transmitting end thrust to the bearing housing, and centrifugal weight means driven by the first shaft for transmitting end thrust to the other shaft to apply to the wire a tension proportional to the square of the first shaft speed whereby the natural frequency of the weight is proportional to the first shaft speed.

2. In combination, a device having a frame with a first rotating shaft journaled therein, a vibration suppressor mounted on said frame, comprising a wire fixed at one end and extending in the general direction of the axis of the first shaft, a weight mounted on the wire, and means for applying to the wire a tension proportional to the square of the first shaft speed whereby the natural frequency of the weight is proportional to shaft speed and the weight applies to the suppressor a counter vibratory force of frequency proportional to first shaft speed.

3. In combination, a device having a frame with a first rotating shaft journaled therein, a vibration suppressor mounted on said frame at one end of the first shaft, a wire coaxial with the first shaft and anchored at one end to the suppressor frame, a bearing housing slidably and non rotatably mounted in the suppressor frame for movement along the axis of the first shaft and anchored to the other end of the wire, a weight mounted on the wire between its ends, another shaft coaxial with the first shaft journaled in and transmitting end thrust to the bearing housing, and centrifugal weight means driven by the first shaft for transmitting end thrust to the other shaft to apply to the wire a tension proportional to the square of the first shaft speed whereby the natural frequency of the weight is proportional to shaft speed and the weight applies to the suppressor a counter vibratory force of frequency proportional to first shaft speed.

4. In combination, a device having a frame with a rotating shaft journaled therein, a tension means of negligible bending stiffness mounted on the frame and extending in the direction of the shaft, a weight mounted on said tension means, and means responsive to the shaft speed for applying to the tension means a tension proportional to the square of the shaft speed.

5. In combination, a device having a frame with a rotating shaft journaled therein, a tension means of negligible bending stiffness mounted on the frame and extending in the direction of the shaft, a weight mounted on said tension means, and centrifugal means rotated at a speed proportional to the shaft speed for applying to the tension means a tension proportional to the square of the shaft speed whereby the natural frequency of the weight is proportional to shaft speed and the weight applies to the suppressor a counter vibratory force of frequency proportional to shaft speed.

6. In combination, a vibrating body, an elongated tension member of negligible bending stiffness and having appreciable mass mounted on said body with its length in a direction generally perpendicular to the direction of vibration, and means responsive to the vibration frequency for applying to the tension member tension which is proportional to the square of the vibration frequency.

7. In combination, a device having a frame with a rotating shaft journaled therein, a weight, tension means for mounting the weight on the frame for vibration in a direction radial to the axis of the shaft, an impeller driven by the shaft for producing a fluid pressure proportional to the square of the shaft speed, and means actuated by said fluid pressure for applying to the tension means a tension proportional to the square of the shaft speed.

8. In combination, a device having a frame with a rotating shaft journaled therein, a weight, tension means for mounting the weight on the frame for vibration in a direction radial to the axis of the shaft, spaced diaphragms fixed to the tension means, one of the diaphragms being of larger area than the other and the larger diaphragm being outermost, an impeller driven by the shaft for producing a fluid pressure proportional to the square of the shaft speed, and a conduit for conducting the fluid pressure to the space between the diaphragms to apply to the tension means a tension proportional to the square of the shaft speed.

9. In combination, a vibrating body, a tension member of negligible bending stiffness and having appreciable mass mounted on said body in a direction generally perpendicular to the direction of vibration, pick up means responsive to the vibration of the body, a frequency to D.C. converter for the output of the pick up means, and magnetic coils in series with the output of the frequency to D.C. converter for tensioning the tension member proportional to the square of the vibration frequency.

References Cited by the Examiner
UNITED STATES PATENTS

| | | | |
|---|---|---|---|
| 989,958 | 4/1911 | Frahm | 188—1 |
| 2,226,571 | 12/1940 | McGoldrick | 188—1 |

MILTON BUCHLER, *Primary Examiner.*

DUANE A. REGER, ARTHUR L. LA POINT,
*Examiners.*